United States Patent
Kim et al.

(10) Patent No.: US 12,277,887 B2
(45) Date of Patent: Apr. 15, 2025

(54) METHOD OF DETECTING STAIN OF DISPLAY PANEL, METHOD OF COMPENSATING STAIN OF DISPLAY PANEL INCLUDING THE SAME AND DISPLAY APPARATUS CONFIGURED TO PERFORM THE SAME

(71) Applicant: Samsung Display Co., Ltd., Yongin-Si (KR)

(72) Inventors: Huisu Kim, Busan (KR); Seyun Kim, Hwaseong-si (KR); Hyungwoo Yim, Hwaseong-si (KR); Hakmo Choi, Seoul (KR); Seungho Park, Suwon-si (KR); Kyung-Sik Joo, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 220 days.

(21) Appl. No.: 18/085,489

(22) Filed: Dec. 20, 2022

(65) Prior Publication Data

US 2023/0245610 A1    Aug. 3, 2023

(30) Foreign Application Priority Data

Feb. 3, 2022    (KR) .................. 10-2022-0014333

(51) Int. Cl.
*G09G 3/20*    (2006.01)
*G06T 7/90*    (2017.01)

(52) U.S. Cl.
CPC ............. *G09G 3/2003* (2013.01); *G06T 7/90* (2017.01); *G06T 2207/20221* (2013.01);
(Continued)

(58) Field of Classification Search
CPC ......... G09G 3/2003; G09G 2320/0233; G09G 2320/0242; G09G 2320/0673; G09G 2330/08; G09G 2320/0693; G09G 2360/147; G09G 3/006; G09G 2320/0276; G06T 7/90; G06T 2207/20221; G06T 2207/30168; G06T 2207/10024; G06T 2207/20036; G06T 2207/30121; G06T 7/0004; G06T 7/174; G06T 5/50; G09F 9/30

See application file for complete search history.

(56) References Cited

U.S. PATENT DOCUMENTS

2008/0247640 A1*  10/2008  Ukita .................. G06T 7/90
                                                382/165
2022/0019617 A1*  1/2022  Yamanaka ....... G06V 30/19073

FOREIGN PATENT DOCUMENTS

KR    10-2017-0002770 A    1/2017
KR    10-1862310 B1    5/2018
(Continued)

*Primary Examiner* — Chong Wu
(74) *Attorney, Agent, or Firm* — Innovation Counsel LLP

(57) ABSTRACT

A method of detecting a stain of a display panel is disclosed that includes capturing a first color image of the display panel, capturing a second color image of the display panel, generating a merged image by merging a color coordinate map of the first color image and a color coordinate map of the second color image, generating a background image of the merged image by a morphology filtering, generating a flattened image by operating the merged image and the background image and detecting an area of the flattened image in which a color coordinate value exceeds a threshold value as a stain area.

20 Claims, 11 Drawing Sheets

(52) U.S. Cl.
CPC .............. *G06T 2207/30168* (2013.01); *G09G 2320/0233* (2013.01); *G09G 2320/0242* (2013.01); *G09G 2320/0673* (2013.01); *G09G 2330/08* (2013.01)

(56) References Cited

FOREIGN PATENT DOCUMENTS

| KR | 10-2175702 | B1 | 11/2020 |
| KR | 10-2021-0085411 | A | 7/2021 |

* cited by examiner

METHOD OF DETECTING STAIN OF DISPLAY PANEL, METHOD OF COMPENSATING STAIN OF DISPLAY PANEL INCLUDING THE SAME AND DISPLAY APPARATUS CONFIGURED TO PERFORM THE SAME

PRIORITY STATEMENT

This application claims priority under 35 U.S.C. § 119 to Korean Patent Application No. 10-2022-0014333, filed on Feb. 3, 2022, in the Korean Intellectual Property Office KIPO, the contents of which are herein incorporated by reference in their entireties.

BACKGROUND

1. Field

The present inventive concept relates to a method of detecting a stain of a display panel, a method of compensating a stain of the display panel including the method and a display apparatus operable to perform the method. More particularly, the present inventive concept relates to a method of detecting a stain of a display panel capable of automatically detecting a single color stain based on a color coordinate of a first color image and a color coordinate of a second color image, a method of compensating a stain of the display panel including the method and a display apparatus operable to perform the method.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver providing gate signals to the gate lines, a data driver providing data voltages to the data lines and a driving controller controlling the gate driver and the data driver.

A luminance uniformity of the display panel may be deteriorated due to a process variation of the display panel. The driving controller may compensate a stain to enhance the luminance uniformity of the display panel. When image data for one grayscale level is used for the stain compensation, an accuracy of the stain compensation may decrease. When the stain compensation is performed based on a white image (or a gray image), the blue image or the red image may be over-compensated so that the display quality may be deteriorated.

SUMMARY

Embodiments of the present inventive concept may provide a method of detecting a stain of a display panel capable of automatically detecting a single color stain based on a color coordinate of a first color image and a color coordinate of a second color image.

Embodiments of the present inventive concept may also provide a method of compensating the stain of the display panel including the method of detecting the stain of the display panel.

Embodiments of the present inventive concept may also provide a display apparatus operable to perform the method of compensating the stain of the display panel.

An embodiment of a method of detecting a stain of a display panel includes capturing a first color image of the display panel, capturing a second color image of the display panel, generating a merged image by merging a color coordinate map of the first color image and a color coordinate map of the second color image, generating a background image of the merged image by a morphology filtering, generating a flattened image by operating the merged image and the background image and detecting an area of the flattened image in which a color coordinate value exceeds a threshold value as a stain area.

In an embodiment, the first color image may be a red image. The second color image may be a blue image.

In an embodiment, the method of compensating the stain of the display panel may further include removing a noise of the color coordinate map of the first color image using an average filter and removing a noise of the color coordinate map of the second color image using the average filter.

In an embodiment, the method of compensating the stain of the display panel may further include inverting one of the color coordinate map of the first color image and the color coordinate map of the second color image, prior to generating the merged image, when a polarity of a color difference of the color coordinate map of the first color image and a polarity of a color difference of the color coordinate map of the second color image are opposite.

In an embodiment, both of the color coordinate map of the first color image and the color coordinate map of the second color image are not inverted, when the polarity of the color difference of the color coordinate map of the first color image and the polarity of the color difference of the color coordinate map of the second color image are same.

In an embodiment, the method of compensating the stain of the display panel may further include normalizing the color coordinate map of the first color image in a first color coordinate region and normalizing the color coordinate map of the second color image in the first color coordinate region prior to generating the merged image In an embodiment, the background image of the merged image may be generated using a maximum filter having a size greater than a size of the stain of the merged image or a minimum filter having a size greater than the size of the stain.

In an embodiment, when the polarity of the stain is positive, the background image may be generated using the minimum filter having the size greater than the size of the stain.

In an embodiment, when the polarity of the stain is negative, the background image may be generated using the maximum filter having the size greater than the size of the stain.

In an embodiment, the method of compensating the stain of the display panel may further include generating an extended stain area by extending a region from a region continuously adjacent to the stain area to a region exceeding a second threshold value which is less than the threshold value.

An embodiment of a method of compensating a stain of a display panel includes capturing a first color image of the display panel, capturing a second color image of the display panel, generating a merged image by merging a color coordinate map of the first color image and a color coordinate map of the second color image, generating a background image of the merged image by a morphology filtering, generating a flattened image by operating the merged image and the background image, detecting an area of the flattened image in which a color coordinate value exceeds a threshold value as a stain area and generating a first color compensation scale factor, a second color compensation scale factor and a third color compensation scale factor for the stain area to compensate input image data.

In an embodiment, the first color image may be a red image. The second color image may be a blue image. The first color compensation scale factor may be a red compensation scale factor. The second color compensation scale factor may be a blue compensation scale factor. The third color compensation scale factor may be a green compensation scale factor.

In an embodiment, the red compensation scale factor may be less than the green compensation scale factor.

In an embodiment, the blue compensation scale factor may be less than the green compensation scale factor.

In an embodiment, the red compensation scale factor may be determined based on the red image. The blue compensation scale factor may be determined based on the blue image. The green compensation scale factor may be determined based on a white image.

In an embodiment, the method may further include inverting one of the color coordinate map of the first color image and the color coordinate map of the second color image, prior to generating the merged image, when a polarity of a color difference of the color coordinate map of the first color image and a polarity of a color difference of the color coordinate map of the second color image are opposite.

In an embodiment, the method may further include normalizing the color coordinate map of the first color image in a first color coordinate region and normalizing the color coordinate map of the second color image in the first color coordinate region prior to generating the merged image.

In an embodiment, the background image of the merged image may be generated using a maximum filter having a size greater than a size of the stain of the merged image or a minimum filter having a size greater than the size of the stain.

In an embodiment, when the polarity of the stain is positive, the background image may be generated using the minimum filter having the size greater than the size of the stain. When the polarity of the stain is negative, the background image may be generated using the maximum filter having the size greater than the size of the stain.

An embodiment of a display apparatus includes a display panel, a driving controller and a data driver. The driving controller is configured to capture a first color image of the display panel and a second color image of the display panel, to generate a merged image by merging a color coordinate map of the first color image and a color coordinate map of the second color image, to generate a background image of the merged image by a morphology filtering, to generate a flattened image by operating the merged image and the background image, to detect an area of the flattened image in which a color coordinate value exceeds a threshold value as a stain area, to generate a first color compensation scale factor, a second color compensation scale factor and a third color compensation scale factor for the stain area to compensate input image data to generate a data signal. The data driver is configured to convert the data signal to a data voltage and to output the data voltage to the display panel.

According to the method of detecting the stain of the display panel, the method of compensating the stain of the display panel and the display apparatus, the single color stain may be effectively and automatically detected based on a color coordinate of a red image and a color coordinate of a blue image. In addition, the luminance based stain compensation is performed for the red image and the blue image so that the red image and the blue image may not be over-compensated. Thus, the display quality of the display panel may be enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
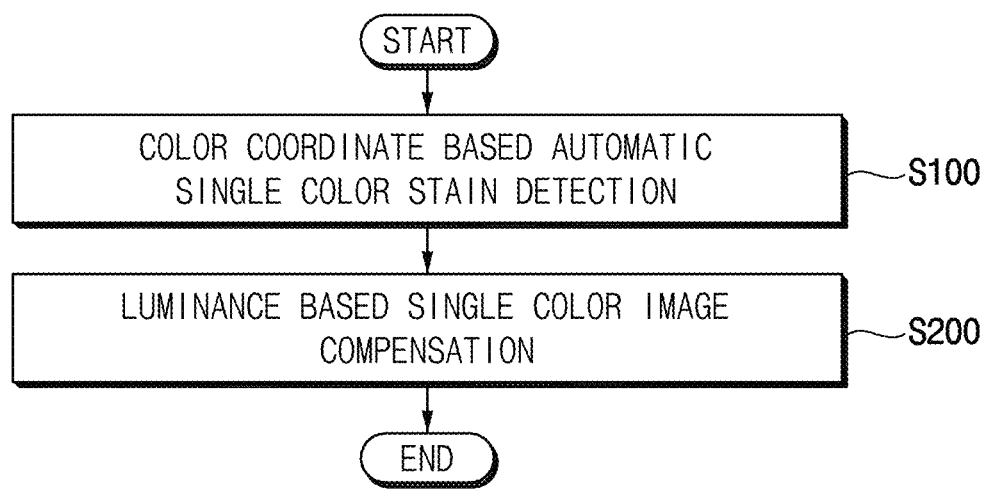
FIG. 1 is a flowchart illustrating a method of compensating a stain of a display panel according to an embodiment of the present inventive concept.
Figure 2:
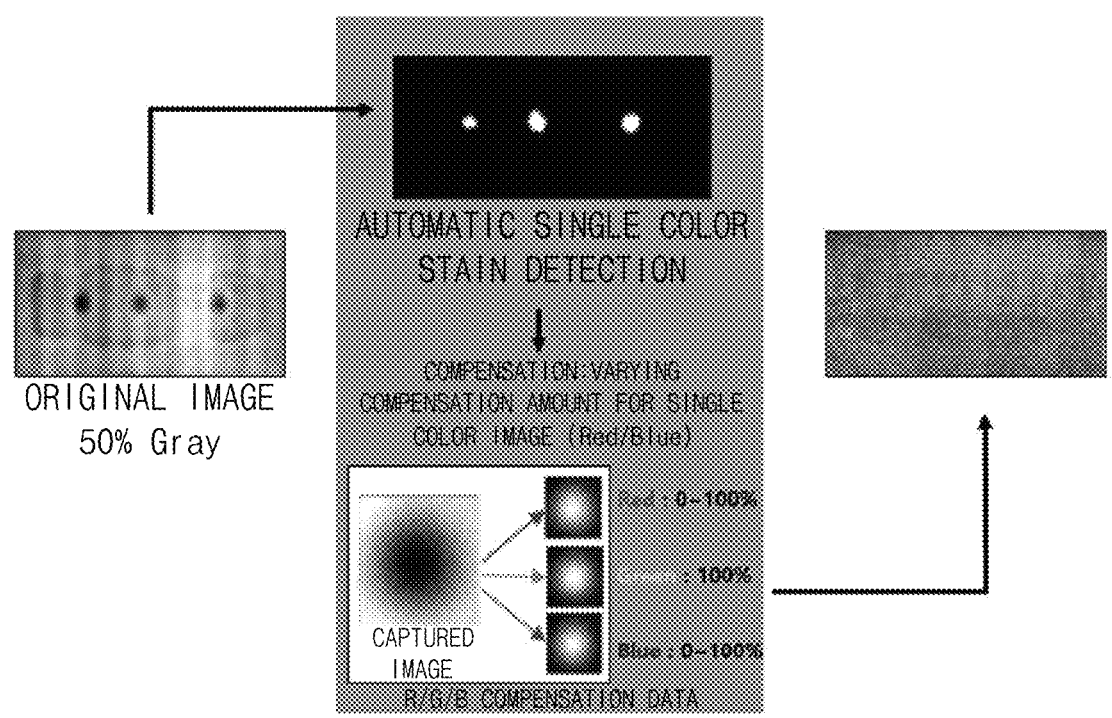
FIG. 2 is a conceptual diagram illustrating the method of compensating the stain of the display panel of FIG. 1.

FIG. 1 is a flowchart illustrating a method of compensating a stain of a display panel according to an embodiment of the present inventive concept. FIG. 2 is a conceptual diagram illustrating the method of compensating the stain of the display panel of FIG. 1.

Referring to FIGS. 1 and 2, the method of compensating the stain of the display panel includes an operation of a color coordinate based automatic single color stain detection (operation S100) and an operation of a luminance based single color image compensation (operation S200).

The operation of the color coordinate based automatic single color stain detection (operation S100) is explained referring to FIGS. 3 to 14 in detail.

Figures 15, 16:
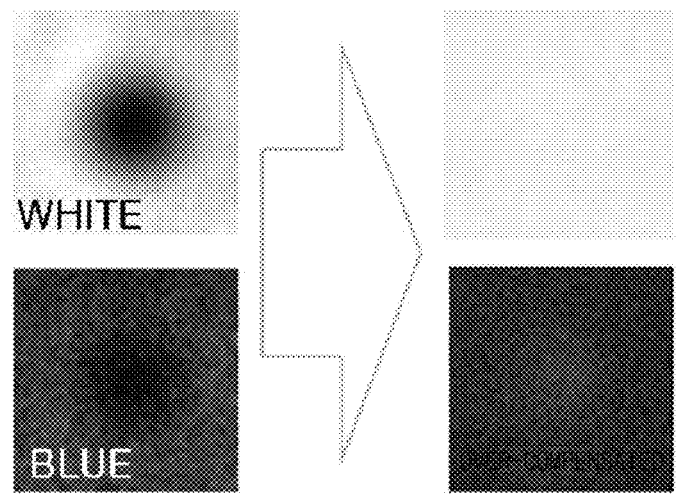
FIG. 15 is a conceptual diagram illustrating an operation of a single color image compensation according to a comparative embodiment.
FIG. 16 is a conceptual diagram illustrating an operation of a luminance based single color image compensation according to the present embodiment.

The operation of the luminance based single color image compensation (operation S200) is explained referring to FIGS. 15 and 16 in detail.

Generally, the stain may be detected and compensated based on a white image (or a gray image). In a case that the stain is detected and compensated based on the white image (or the gray image), an area corresponding to the stain may be properly compensated when the display panel displays a green image having a great luminance component.

However, in a case that the stain is detected and compensated based on the white image (or the gray image), an area corresponding to the stain may be over-compensated when the display panel displays a blue image. Accordingly, the area corresponding to the stain may become brighter than other areas due to the over-compensation.

In addition, in a case that the stain is detected and compensated based on the white image (or the gray image), an area corresponding to the stain may be over-compensated when the display panel displays a red image. Accordingly, the area corresponding to the stain may become brighter than other areas due to the over-compensation.

A left portion of FIG. 2 represents a gray image having 50% gray and including stains. In the present embodiment, a stain area having a high risk of defect when displaying a single color image may be automatically detected through the operation of the color coordinate based automatic single color stain detection (operation S100). When the stain area is automatically detected, a red compensation scale factor, a green compensation scale factor and a blue compensation scale factor applied to the stain area may be determined. The red compensation scale factor, the green compensation scale factor and the blue compensation scale factor are applied to the input image data so that the stain of the display panel may be compensated (operation S200).

The red color coordinate and the blue color coordinate may deviate from target values due to the stain. In the compensation operation (operation S200), the image data may be compensated based on not the color coordinate but the luminance. When the compensation scale factor is determined such that the luminance is not over-compensated, the degree to which the deviation of the color coordinate is perceived by a user may be minimized.

Figure 3:
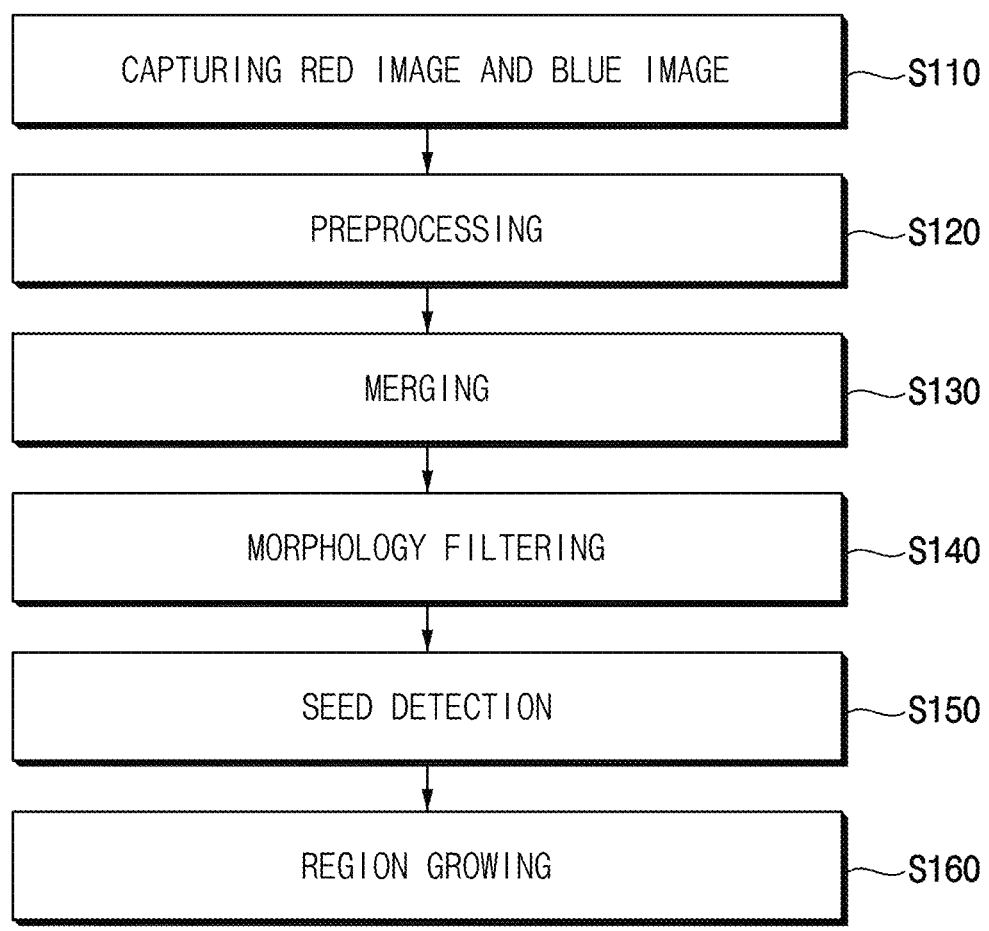
FIG. 3 is a flowchart illustrating an operation of a color coordinate based automatic single color stain detection of FIG. 1.
Figure 4:
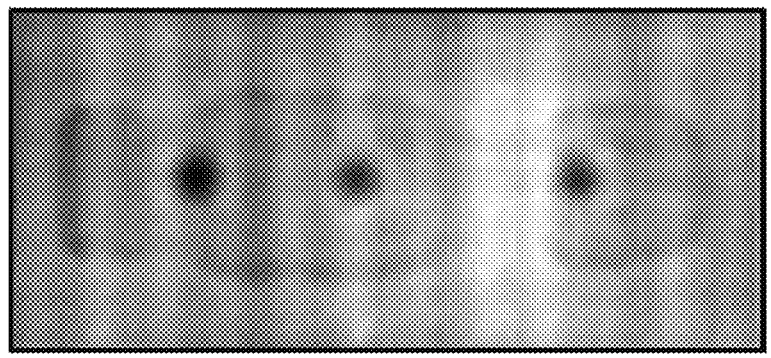
FIG. 4 illustrates a captured gray image (or a captured white image)
Figure 5:
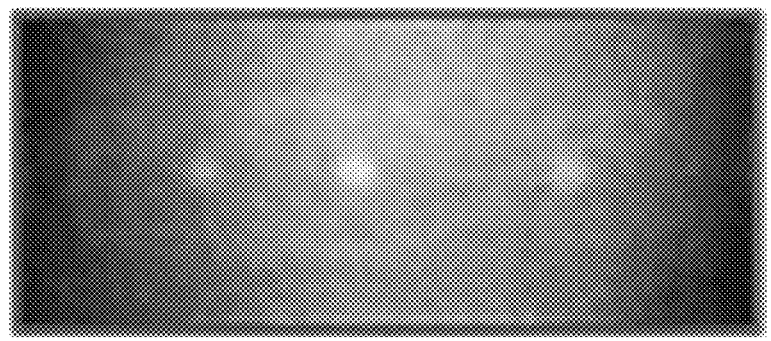
FIG. 5 illustrates a color coordinate map of a red image captured in an operation S110 of FIG. 3.
Figure 6:
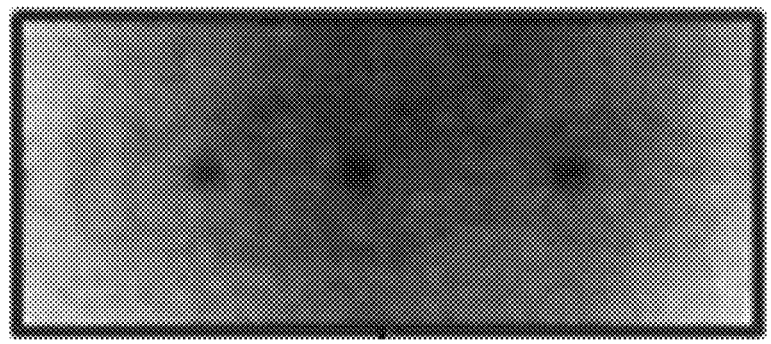
FIG. 6 illustrates a color coordinate map of a blue image captured in the operation S110 of FIG. 3.
Figure 7:
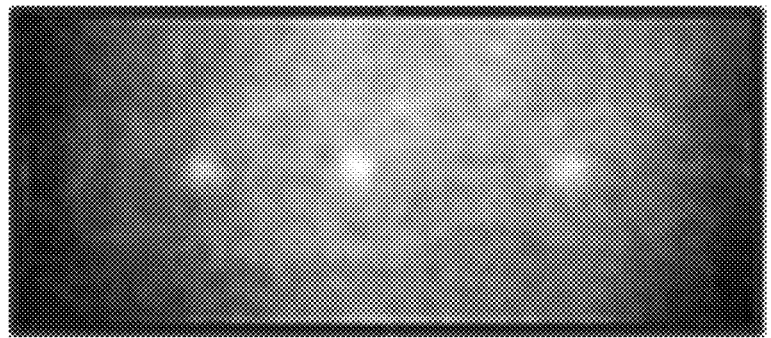
FIG. 7 illustrates an inverted color coordinate map of the blue image generated in an operation S120 of FIG. 3.
Figure 8:
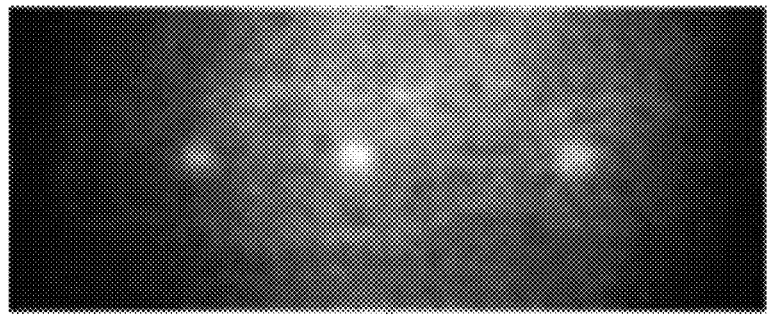
FIG. 8 illustrates a merged image generated in an operation S130 of FIG. 3.

FIG. 3 is a flowchart illustrating an operation of a color coordinate based automatic single color stain detection of FIG. 1. FIG. 4 illustrates a captured gray image (or a captured white image). FIG. 5 illustrates a color coordinate map of a red image captured in an operation S110 of FIG. 3. FIG. 6 illustrates a color coordinate map of a blue image captured in the operation S110 of FIG. 3. FIG. 7 illustrates an inverted color coordinate map of the blue image generated in an operation S120 of FIG. 3. FIG. 8 illustrates a merged image generated in an operation S130 of FIG. 3.

Referring to FIGS. 1 to 8, a first color image of the display panel may be captured and a second color image of the display panel may be captured (operation S110). For example, the first color image may be a red image and the second color image may be a blue image. For example, the first color image may be a red image having a 50% grayscale value and the second color image may be a blue image having a 50% grayscale value.

FIG. 4 illustrates the captured gray image having a 50% grayscale value corresponding to the first image data and the second image data. The image of FIG. 4 may be represented in terms of luminance. In contrast, the images of FIGS. 5 and 6 may be represented not in terms of luminance but in terms of color coordinate. A bright portion of FIG. 4 may indicate that the luminance is brighter than a luminance of other areas. A dark portion of FIG. 4 may indicate that the luminance is darker than the luminance of other areas. A bright portion of FIGS. 5 and 6 may indicate that the color coordinate is greater than a color coordinate of other areas. A dark portion of FIGS. 5 and 6 may indicate that the color coordinate is less than the color coordinate of other areas.

A preprocessing (operation S120) may be applied to the color coordinate map of the first color image (in FIG. 5) and the color coordinate map of the second color image (in FIG. 6).

For example, a noise of the color coordinate map of the first color image may be removed using an average filter. For example, a noise of the color coordinate map of the second color image may be removed using the average filter. For example, the average filter may be a three by three average filter. The step of removing noise may not be an essential step in the present inventive concept so that the step of removing noise may be omitted according to an embodiment. An accuracy of the detection of the stain area may be enhanced by the step of removing noise.

When a polarity of a color difference of the color coordinate map of the first color image and a polarity of a color difference of the color coordinate map of the second color image are opposite, one of the color coordinate map of the first color image and the color coordinate map of the second color image may be inverted in the preprocessing operation (operation S120).

A color difference portion (corresponding to the stain) of the red color coordinate map of FIG. 5 is represented relatively brighter and a polarity of the color difference portion (corresponding to the stain) of the red color coordinate map of FIG. 5 may be positive. In contrast, a color difference portion (corresponding to the stain) of the blue color coordinate map of FIG. 6 is represented relatively darker and a polarity of the color difference portion (corresponding to the stain) of the blue color coordinate map of FIG. 6 may be negative.

When the color coordinate map of the first color image and the color coordinate map of the second color image are merged to generate the merged image, if the polarity of the color difference of the color coordinate of the first color image and the polarity of the color difference of the color coordinate of the second color image are same, the color difference portion may be amplified so that the accuracy of the detection of the stain area may be enhanced. Thus, when the polarity of the color difference of the color coordinate map of the first color image and the polarity of the color difference of the color coordinate map of the second color image are opposite, one of the color coordinate map of the first color image and the color coordinate map of the second color image may be inverted.

FIG. 7 illustrates the color coordinate map in which the color difference portion (corresponding to the stain) of the blue color coordinate map is inverted. The polarity of the color difference in FIG. 6 may be negative and the polarity of the color difference in FIG. 7 may be positive.

Although the color coordinate of the blue color coordinate map is inverted in the present embodiment, the present inventive concept may not be limited thereto. Alternatively, the color coordinate of the red color coordinate map may be inverted.

When the polarity of the color difference of the color coordinate map of the first color image and the polarity of the color difference of the color coordinate map of the second color image are same, both of the color coordinate map of the first color image and the color coordinate map of the second color image may not be inverted in the preprocessing operation (operation S120).

The preprocessing operation (operation S120) may include normalizing the color coordinate map of the first color image in a first color coordinate region and normalizing the color coordinate map of the second color image in the first color coordinate region.

A difference (a first scale) between a maximum value of the blue color coordinate and a minimum value of the blue color coordinate may be different from a difference (a second scale) between a maximum value of the red color coordinate and a minimum value of the red color coordinate. When a merged image is generated by merging the blue color coordinate map and the red color coordinate map in a state where the first scale of the blue color coordinate and the second scale of the red color coordinate are different from each other, there may be a large difference in the contribution of the blue component and the contribution of the red component in the merged image.

For example, when the contribution of the blue component is greater than the contribution of the red component in the merged image and the stain is detected in the merged image, a stain in the blue image is more likely to be detected than a stain in the red image. In contrast, when the contribution of the red component is greater than the contribution of the blue component in the merged image and the stain is detected in the merged image, a stain in the red image is more likely to be detected than a stain in the blue image.

In order to match the contribution of the blue component and the contribution of the red component in the merged image, the color coordinate map of the red image and the color coordinate map of the blue image may be normalized to the same color coordinate region (a reference scale, for example, between 0 and 1). The step of the normalization may not be an essential step in the present inventive concept so that the step of the normalization may be omitted according to an embodiment. An accuracy of the detection of the stain area may be enhanced by the step of the normalization.

The color coordinate of the first color image and the color coordinate of the second color image may be merged (operation S130, MERGING) so that the merged image may be generated after the preprocessing operation (operation S120).

FIG. 8 represents the merged image. In the merged image of FIG. 8, the stain area of FIG. 5 and the stain area of FIG. 7 may be amplified to further emphasize the stain area.

The merged area may be generated by a multiplication operation. For example, the normalized color coordinate map (having values between 0 and 1) of the first color image and the normalized color coordinate map (having values between 0 and 1) of the second color image may be multiplied to generate the merged image (having values between 0 and 1).

Figure 9:
FIG. 9 illustrates a background image of the merged image generated in an operation S140 of FIG. 3.
Figure 10:
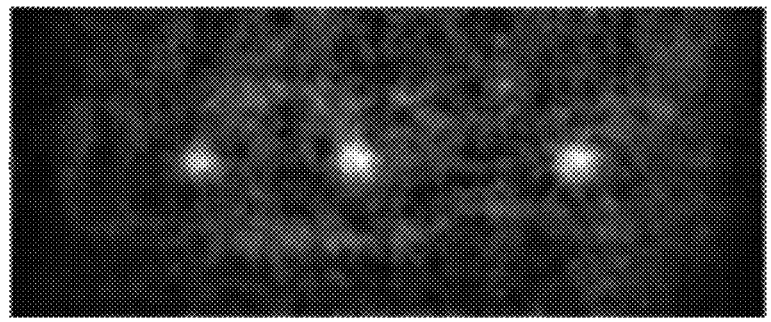
FIG. 10 illustrates a flattened image of the background image generated in the operation S140 of FIG. 3.
Figure 11:
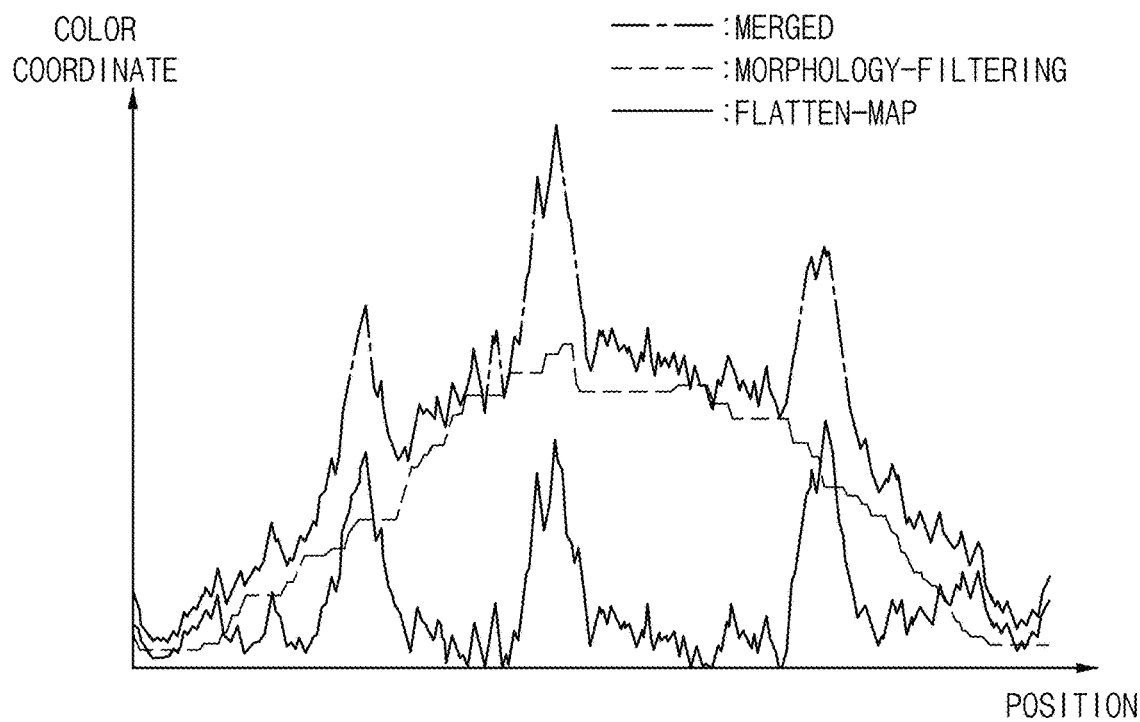
FIG. 11 is a graph illustrating the merged image, the background image and the flattened image.
Figure 12:
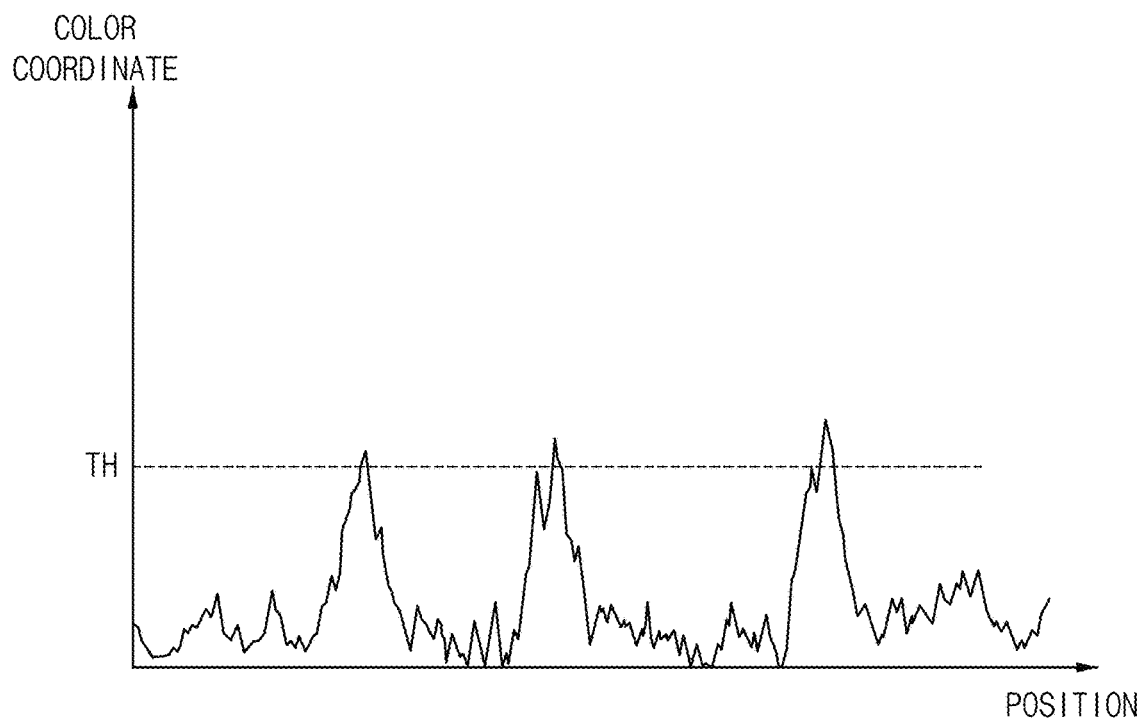
FIG. 12 is a graph illustrating a method of detecting an initial stain area in an operation S150 of FIG. 3.
Figure 13:
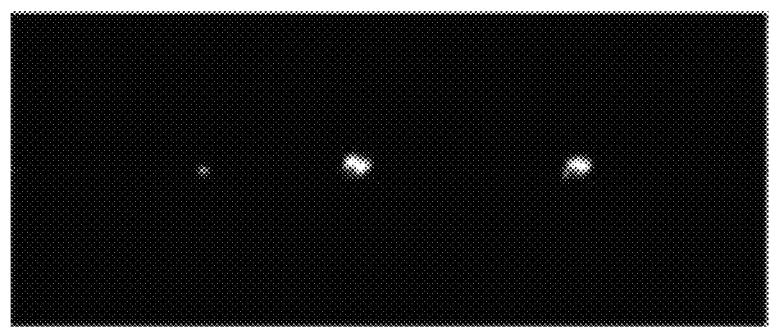
FIG. 13 illustrates the initial stain area generated in the operation S150 of FIG. 3.
Figure 14:
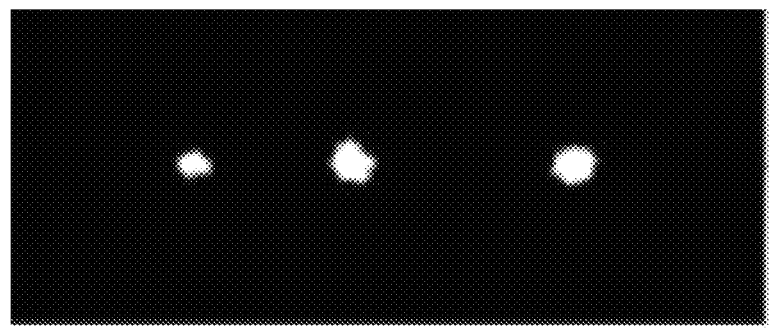
FIG. 14 illustrates an extended stain area generated in an operation S160 of FIG. 3.

FIG. 9 illustrates a background image of the merged image generated in an operation S140 of FIG. 3. FIG. 10 illustrates a flattened image of the background image generated in the operation S140 of FIG. 3. FIG. 11 is a graph illustrating the merged image, the background image and the flattened image. FIG. 12 is a graph illustrating a method of detecting an initial stain area in an operation S150 of FIG. 3. FIG. 13 illustrates the initial stain area generated in the operation S150 of FIG. 3. FIG. 14 illustrates an extended stain area generated in an operation S160 of FIG. 3.

Referring to FIGS. 1 to 14, after the merged image is generated, a background image of the merged image may be generated by a morphology filtering. In the first color image of FIG. 5 and the second color image of FIG. 6, the color coordinates of a center portion and a corner portion do not tend to match. In addition, in the merged image of FIG. 9, the color coordinates of a center portion and a corner portion do not tend to match. Due to the non-uniformity of the color coordinates of the center portion and the corner portion, the accuracy of the detection of the stain area may be decreased.

By the morphology filtering, the background image of the merged image may be generated (operation S140). The background image is shown in FIG. 9.

For example, the background image of the merged image may be generated using a maximum filter having a size greater than a size of the stain of the merged image or a minimum filter having a size greater than the size of the stain. Herein, the size of the stain for determining the size of the filter may be set based on the size of the stain shown in FIGS. 4, 5 and 6. Alternatively, the size of the stain for determining the size of the filter may be preset based on a size of a predicted stain regardless of the captured image.

For example, when the polarity of the stain is positive, the background image may be generated using the minimum filter having a size greater than the size of the stain. For example, when the stain appears bright in the merged image, the background image may be generated by removing the stain in the merged image using the minimum filter having a size greater than the size of the stain.

For example, when the polarity of the stain is negative, the background image may be generated using the maximum filter having a size greater than the size of the stain. For example, when the stain appears dark in the merged image, the background image may be generated by removing the stain in the merged image using the maximum filter having a size greater than the size of the stain.

After obtaining the background image, a flattened image may be generated by operating the merged image and the background image. For example, the flattened image may be generated by subtracting the background image from the merged image. Subtracting the background image from the merged image may mean removing a background component of the merged image. The flattened image is shown in FIG. 10. In the flattened image of FIG. 10, the non-uniformity of the color coordinates of the center portion and the corner portion may be resolved unlike FIG. 8.

In FIG. 11, "MERGED" indicates the merged image, "MORPHOLOGY FILTERING" indicates the background image and "FLATTEN-MAP" indicates the flattened image obtained by removing the background component from the merged image.

After the flattened image is generated, an area in which a color coordinate value exceeds a threshold value TH may be detected as the stain area (operation S150, SEED DETECTION).

The stain area in which the color coordinate value exceeds the threshold value TH, as shown in FIG. 12, is represented in FIG. 13. The stain area of FIG. 13 may be referred to as an initial stain area (SEED) compared to an extended stain area of FIG. 14.

After the stain area is detected, the extended stain area may be generated by extending a region from a region continuously adjacent to the stain area to a region exceeding a second threshold value which is less than the threshold value (operation S160, REGION GROWING).

In this operation, a portion exceeding the second threshold value but not adjacent to the stain area may not be included in the extended stain area.

The extended stain area obtained by extending the initial stain area using the second threshold value is shown in FIG. 14.

For example, the initial stain area may be an area exceeding 6 sigma (the threshold value TH) from a reference value and the extended stain area may be an area exceeding 2 sigma (the second threshold value) from the reference value among regions adjacent to the initial stain area.

The operation of region growing (operation S160) may not be an essential step in the present inventive concept so that the operation of region growing (operation S160) may be omitted according to an embodiment. An accuracy of the detection of the stain area may be enhanced by the operation of region growing (operation S160).

FIG. 15 is a conceptual diagram illustrating an operation of a single color image compensation according to a comparative embodiment.

FIG. 15 illustrates a conventional comparative embodiment in which the stain area is compensated by detecting the stain area based on the gray image (or the white image) of FIG. 4. In case that the stain compensation is operated by detecting the stain area based on the gray image (or the white image), the area corresponding to the stain may be properly compensated when the display panel displays the white image.

However, in the case that the stain compensation is operated by detecting the stain area based on the gray image (or the white image), the area corresponding to the stain may be over-compensated when the display panel displays the blue image. Accordingly, the stain area may be recognized more brightly due to the over-compensation.

FIG. 16 is a conceptual diagram illustrating an operation of a luminance based single color image compensation according to the present embodiment.

Referring to FIGS. 1 to 14 and 16, a first color compensation scale factor, a second color compensation scale factor and a third color compensation scale factor for the stain area may be generated and the input image data may be compensated using the first color compensation scale factor, the second color compensation scale factor and the third color compensation scale factor (operation S200).

Herein, the first color image may be a red image, the second color image may be a blue image, the first color image compensation scale factor may be a red compensation scale factor, the second color image compensation scale factor may be a blue compensation scale factor and the third color image compensation scale factor may be a green compensation scale factor.

The red compensation scale factor may be less than the green compensation scale factor. Since the red compensation scale factor is set to be less than the green compensation scale factor, it is possible to solve a problem that the red image is over-compensated.

The blue compensation scale factor may be less than the green compensation scale factor. Since the blue compensation scale factor is set to be less than the green compensation scale factor, it is possible to solve a problem that the blue image is over-compensated.

The red compensation scale factor may be determined based on the red image captured in the operation S110 and the blue compensation scale factor may be determined based on the blue image captured in the operation S110. The green compensation scale factor may be determined based on the white image.

FIGS. 5 and 6 show the color coordinate components of the red image and the blue image. However, in this operation (operation S200), luminance components of the red image and the blue image may be used.

A left image of FIG. 16 represents an image before compensation. "Ref." indicates the image in which the blue image is over-compensated by the compensation method of the conventional comparative embodiment. "Blue 50%" indicates the image in which the proper blue compensation scale factor is determined based on luminance according to the present embodiment. "Blue 0%" indicates the image to which the compensation is not applied because the compensation scale factor is determined to zero.

According to the present embodiment, the single color stain may be effectively and automatically detected based on the color coordinate of the red image and the color coordinate of the blue image. In addition, the luminance based stain compensation is performed for the red image and the blue image so that the red image and the blue image may not be over-compensated. Thus, the display quality of the display panel may be enhanced.

Figure 17:
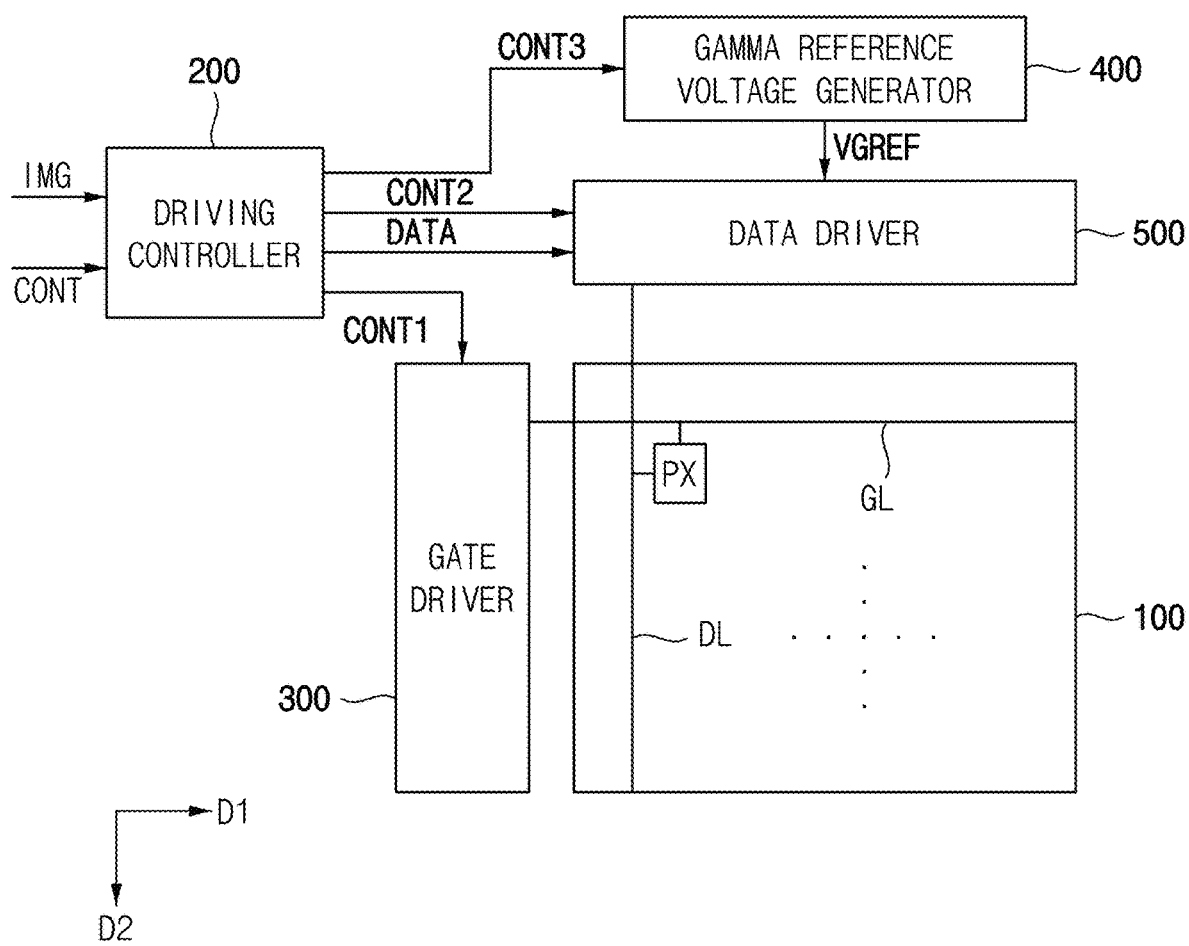
FIG. 17 is a block diagram illustrating a display apparatus according to an embodiment of the present inventive concept.

FIG. 17 is a block diagram illustrating a display apparatus according to an embodiment of the present inventive concept.

Referring to FIGS. 1 to 17, the display apparatus includes the display panel 100 and a display panel driver. The display panel driver includes a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be referred to as a timing controller embedded data driver (TED).

The display panel 100 has a display region on which an image is displayed and a peripheral region adjacent to the display region.

The display panel 100 includes a plurality of gate lines GL, a plurality of data lines DL and a plurality of pixels PX electrically connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus (not shown). The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 may compensate a stain of the input image data IMG to enhance a luminance uniformity of the display panel 100.

In the present embodiment, the driving controller 200 may capture the first color image of the display panel 100 and the second color image of the display panel 100, generate the merged image by merging the color coordinate map of the first color image and the color coordinate map of the second color image, generate the background image of the merged image by the morphology filtering, generate the flattened image by operating the merged image and the background image, detect the area of the flattened image in which the color coordinate value exceeds the threshold value TH as the stain area, generate the first color compensation scale factor, the second color compensation scale factor and the third color compensation scale factor for the stain area to compensate the input image data IMG to generate the data signal DATA.

The operation of the stain compensation of the driving controller 200 was explained referring to FIGS. 1 to 14 and 16 in detail.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

According to the present embodiment, the stain of the display panel may be effectively compensated.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A method of detecting a stain of a display panel, the method comprising:
    capturing a first color image of the display panel;
    capturing a second color image of the display panel;
    generating a merged image by merging a color coordinate map of the first color image and a color coordinate map of the second color image;
    generating a background image of the merged image by a morphology filtering operation;
    generating a flattened image by operating the merged image and the background image; and
    detecting an area of the flattened image in which a color coordinate value exceeds a threshold value as a stain area.

2. The method of claim 1, wherein the first color image is a red image, and
    wherein the second color image is a blue image.

3. The method of claim 1, further comprising:
    removing a noise of the color coordinate map of the first color image using an average filter; and
    removing a noise of the color coordinate map of the second color image using the average filter.

4. The method of claim 1, further comprising:
    inverting one of the color coordinate map of the first color image and the color coordinate map of the second color image, prior to generating the merged image, when a polarity of a color difference of the color coordinate map of the first color image and a polarity of a color difference of the color coordinate map of the second color image are opposite.

5. The method of claim 4, wherein both of the color coordinate map of the first color image and the color coordinate map of the second color image are not inverted, when the polarity of the color difference of the color coordinate map of the first color image and the polarity of the color difference of the color coordinate map of the second color image are same.

6. The method of claim 4, further comprising:
    normalizing the color coordinate map of the first color image in a first color coordinate region and normalizing the color coordinate map of the second color image in the first color coordinate region prior to generating the merged image.

7. The method of claim 1, wherein the background image of the merged image is generated using a maximum filter having a size greater than a size of the stain of the merged image or a minimum filter having a size greater than the size of the stain.

8. The method of claim 7, wherein when the polarity of the stain is positive, the background image is generated using the minimum filter having the size greater than the size of the stain.

9. The method of claim 7, wherein when the polarity of the stain is negative, the background image is generated using the maximum filter having the size greater than the size of the stain.

10. The method of claim 1, further comprising:
generating an extended stain area by extending a region from a region continuously adjacent to the stain area to a region exceeding a second threshold value which is less than the threshold value.

11. A method of compensating a stain of a display panel, the method comprising:
capturing a first color image of the display panel;
capturing a second color image of the display panel;
generating a merged image by merging a color coordinate map of the first color image and a color coordinate map of the second color image;
generating a background image of the merged image by a morphology filtering operation;
generating a flattened image by operating the merged image and the background image;
detecting an area of the flattened image in which a color coordinate value exceeds a threshold value as a stain area; and
generating a first color compensation scale factor, a second color compensation scale factor and a third color compensation scale factor for the stain area to compensate input image data.

12. The method of claim 11, wherein the first color image is a red image,
wherein the second color image is a blue image,
wherein the first color compensation scale factor is a red compensation scale factor,
wherein the second color compensation scale factor is a blue compensation scale factor, and
wherein the third color compensation scale factor is a green compensation scale factor.

13. The method of claim 12, wherein the red compensation scale factor is less than the green compensation scale factor.

14. The method of claim 12, wherein the blue compensation scale factor is less than the green compensation scale factor.

15. The method of claim 12, wherein the red compensation scale factor is determined based on the red image,
wherein the blue compensation scale factor is determined based on the blue image, and
wherein the green compensation scale factor is determined based on a white image.

16. The method of claim 11, further comprising:
inverting one of the color coordinate map of the first color image and the color coordinate map of the second color image, prior to generating the merged image, when a polarity of a color difference of the color coordinate map of the first color image and a polarity of a color difference of the color coordinate map of the second color image are opposite.

17. The method of claim 16, further comprising:
normalizing the color coordinate map of the first color image in a first color coordinate region and normalizing the color coordinate map of the second color image in the first color coordinate region prior to generating the merged image.

18. The method of claim 11, wherein the background image of the merged image is generated using a maximum filter having a size greater than a size of the stain of the merged image or a minimum filter having a size greater than the size of the stain.

19. The method of claim 18, wherein when the polarity of the stain is positive, the background image is generated using the minimum filter having the size greater than the size of the stain, and
wherein when the polarity of the stain is negative, the background image is generated using the maximum filter having the size greater than the size of the stain.

20. A display apparatus comprising:
a display panel; and
a driving controller configured to capture a first color image of the display panel and a second color image of the display panel, to generate a merged image by merging a color coordinate map of the first color image and a color coordinate map of the second color image, to generate a background image of the merged image by a morphology filtering operation, to generate a flattened image by operating the merged image and the background image, to detect an area of the flattened image in which a color coordinate value exceeds a threshold value as a stain area, to generate a first color compensation scale factor, a second color compensation scale factor and a third color compensation scale factor for the stain area to compensate input image data to generate a data signal; and
a data driver configured to convert the data signal to a data voltage and to output the data voltage to the display panel.

* * * * *